US005946968A

United States Patent [19]

Lee

[11] Patent Number: 5,946,968

[45] Date of Patent: Sep. 7, 1999

[54] SWING MECHANISM FOR WAVE-PRODUCING ORNAMENT

[76] Inventor: Vincent Kuo Wei Lee, No. 44, Lane 458, Sheh Chung Street, Taipei, Taiwan

[21] Appl. No.: 09/010,058

[22] Filed: Jan. 21, 1998

[51] Int. Cl.[6] ............................ F16H 21/18; G09F 19/00

[52] U.S. Cl. .................................. 74/45; 40/406; 40/429; 40/430; 434/126; 446/267

[58] Field of Search .................................. 74/45; 40/406, 40/429, 430; 434/126; 446/267

[56] References Cited

U.S. PATENT DOCUMENTS

| | | | |
|---|---|---|---|
| 1,803,864 | 5/1931 | Newman | 74/45 |
| 1,853,381 | 4/1932 | Scheibell | 74/89.22 |
| 2,699,119 | 1/1955 | Healey | 74/89.22 |
| 4,378,706 | 4/1983 | Miyamoto | 74/89.22 |
| 5,706,595 | 1/1998 | Lin | 40/406 |

*Primary Examiner*—Tamara L. Graysay
*Assistant Examiner*—David Fenstermacher
*Attorney, Agent, or Firm*—Bacon & Thomas, PLLC

[57] ABSTRACT

A swing mechanism for wave-producing ornament. The ornament includes a base and a liquid container and the swing mechanism is mounted inside the base with a top container holder projecting from the base to fixedly connect the liquid container thereto. The swing mechanism includes a round disc which is rotated by a motor in the base of the ornament, a connecting rod pivotally connected to the round disc near an outer periphery thereof, and a sleeve defining a downward open cylindrical inner space with a narrowed lower end for an upper half part of the connecting rod to extend into. The upper half part of the connecting rod are two upward extended arms which slide up and down in the cylindrical inner space like a piston. When the round disc is rotated, the connecting rod moves in circumferential movement, bringing the sleeve and accordingly the liquid container fixedly connected to a top of the sleeve to swing relative to the base of the ornament.

5 Claims, 3 Drawing Sheets

SWING MECHANISM FOR WAVE-PRODUCING ORNAMENT

BACKGROUND OF THE INVENTION

A wave-producing ornament is a device containing liquid to show changeful waves and mainly includes a base and a liquid container. A swing mechanism is mounted in the base to cause the liquid container supported on a top of the base to swing like a seesaw, so that liquid in the liquid container waves to produce changeful and beautiful views. There are at least four different types of swing mechanisms for such wave-producing ornaments, including cam driving type, push bar driving type, and cradle swinging type. Some of these swing mechanisms are currently available in the market and some are presently patent pending. The cam driving type and the push bar driving type are simple in their structure but they are designed to directly push the considerably heavy liquid container and therefore tend to wear and break due to friction.

It is therefore tried by the inventor to develop a swing mechanism for the wave-producing ornaments that is simple in structure and is not subject to easy wear.

SUMMARY OF THE INVENTION

A primary object of the present invention is to provide a swing mechanism for wave-producing ornament that utilizes a rotating round disc to drive a connecting rod which slides up and down in a cylindrical sleeve like a piston and thereby causes the cylindrical sleeve to swing.

The swing mechanism according to the present invention is mounted inside a base of the wave-producing ornament with a top container holder projecting from the base to fixedly connect a liquid container of the ornament thereto. The swing mechanism includes a round disc which is rotated by a motor and a gearbox in the base of the ornament, a connecting rod pivotally connected to the round disc near outer periphery thereof, and a sleeve defining a downward open cylindrical inner space with a narrowed lower end for an upper half part of the connecting rod to extend into. The upper half part of the connecting rod are two upward and parallelly extended arms with two outward projected lugs formed at top free ends thereof. When a force is applied on the two arms to push them inward, the arms can be extended through the narrowed lower opening of the cylindrical inner space of the sleeve. When the arms are released, the lugs abut against inner side of the narrowed lower opening and prevent the connecting rod from falling out of the sleeve. A plurality of pin holes are formed on an upper portion of the sleeve in two vertical and diametrically opposite lines for an insertion pin to selectively extend through, so that the sleeve may freely swing about the insertion pin. When the round disc is rotated, the connecting rod moves in circumferential movement with the two arms sliding up and down in the cylindrical sleeve like a piston while the sleeve swinging about the insertion pin. At this point, the liquid container fixedly connected to the top container holder of the sleeve synchronously swings with the sleeve relative to the base of the ornament. The whole swing mechanism of the present invention can be easily assembled to operate in a stable and durable manner.

DETAILED DESCRIPTION OF THE PREFERRED EMBODIMENT

Figure 1:
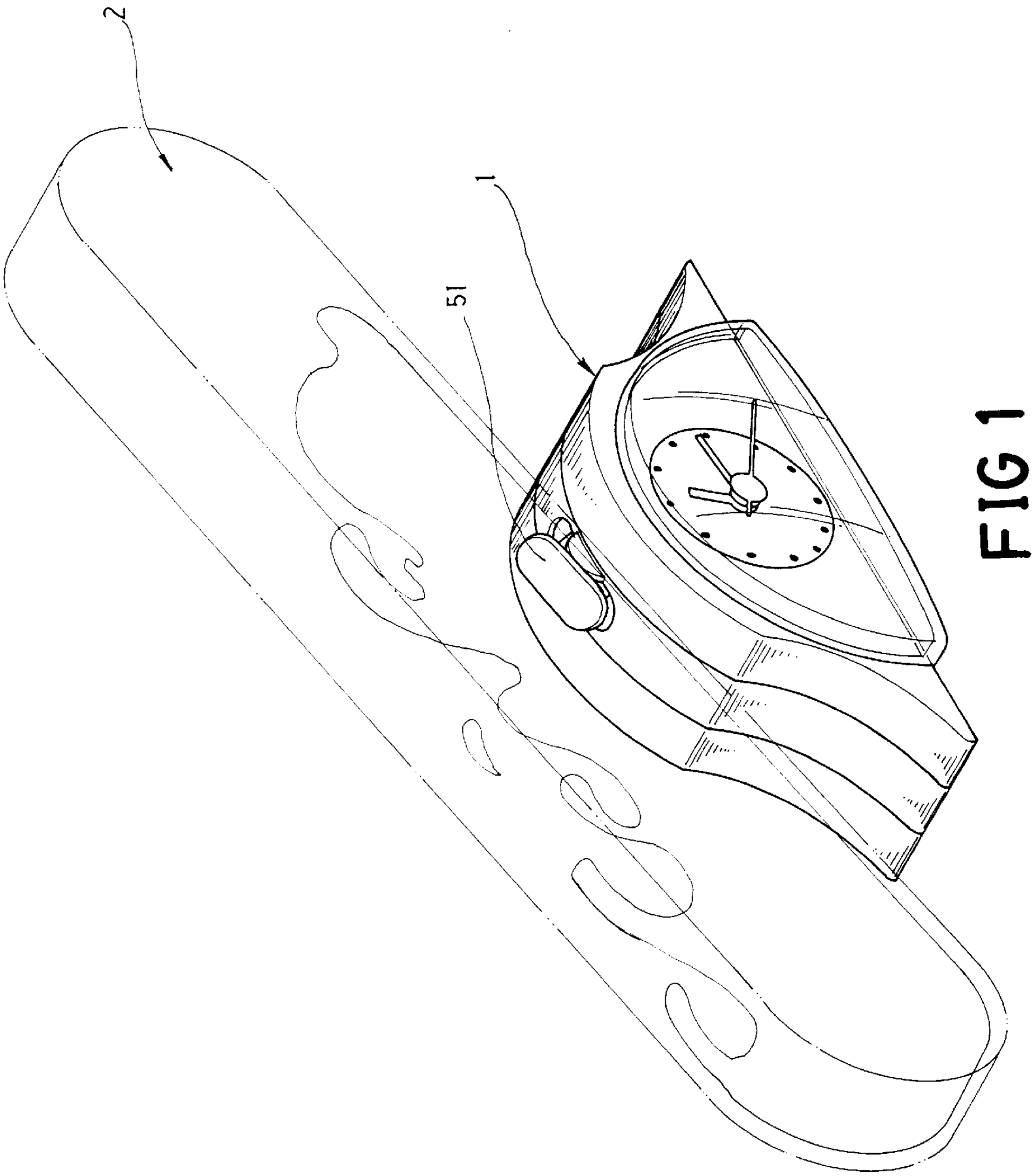
FIG. 1 is a schematic perspective showing a wave-producing ornament adopting the swing mechanism of the present invention.

Please refer to FIG. 1 that shows a wave-producing ornament with which a swing mechanism according to the present invention is associated. The wave-producing ornament is generally similar to other commercially available wave-producing ornaments in its appearance and mainly includes a base 1 and a liquid container 2. However, the wave-producing ornament associated with the present invention is different from others in an internally mounted swing mechanism. The swing mechanism of the present invention is mounted inside the base 1 with only a container holder 51 projected from a top of the base 1 for the liquid container 2 to fixedly connect thereto.

Figure 2:
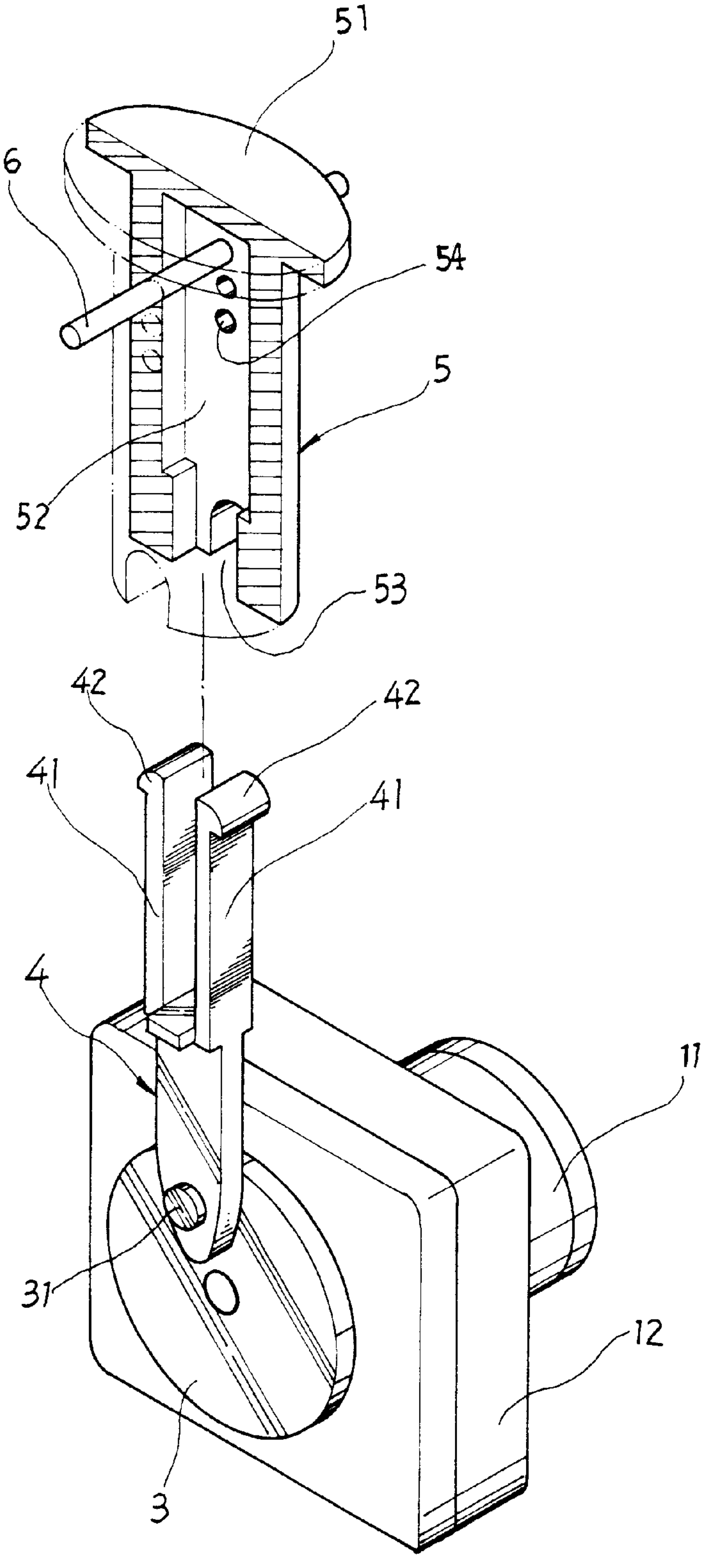
FIG. 2 is an exploded perspective of the swing mechanism of the present invention.
Figures 3A, 3B, 3C, 3D:
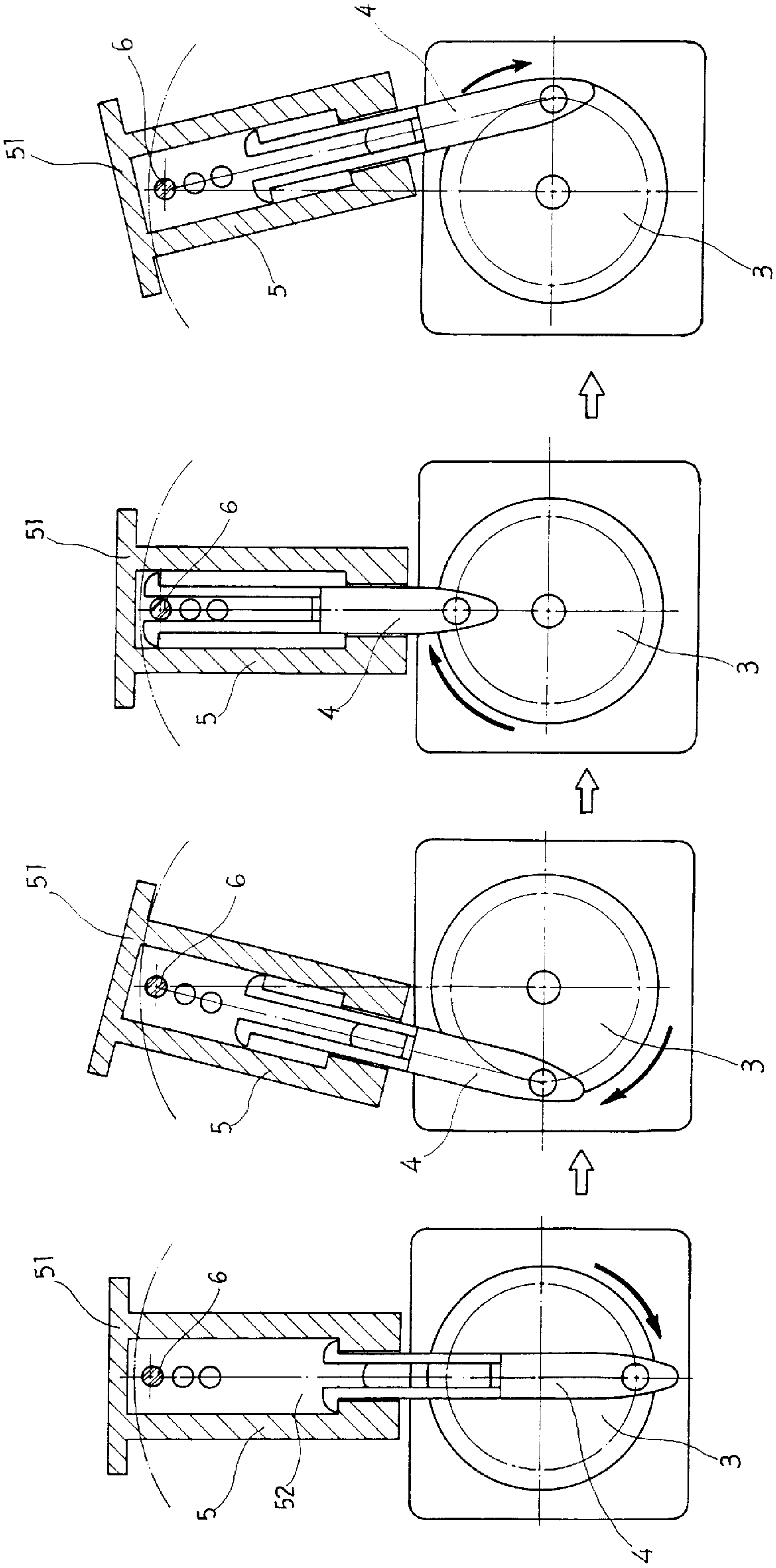
FIGS. 3A to 3D illustrate four different phases in an operation cycle of the present invention.

Please now refer to FIG. 2. The swing mechanism of the present invention mainly includes a round disc 3, a connecting rod 4, a sleeve 5, and an insertion pin 6. The round disc 3 is driven by a motor 11 and a gearbox 12 fixedly mounted in the base 1 to rotate at a predetermined speed. The connecting rod 4 is pivotally connected at a lower end to a fixed point 31 near outer periphery of the round disc 3. An upper half part of the connecting rod 4 forms two separate and parallel arms 41 defining an upward open space between the arms 41. The arms 41 are formed at their top free ends with outward projected lugs 42. The sleeve 5 includes a top and a cylindrical body below the top. The top of the sleeve 5 forms the container holder 51 for fixedly connecting the liquid container 2 thereto. The cylindrical body of the sleeve 5 defines a cylindrical inner space 52 having an inner diameter substantially the same as a breadth defined by the two outward projected lugs 42, allowing the two arms 41 of the connecting rod 4 to smoothly slide up and down inside the cylindrical inner space 52. A lower end of the cylindrical inner space 52 has reduced inner diameter and forms a narrowed opening 53. To insert the arms 41 into the cylindrical inner space 52, a minor force is applied on the arms 41 to push them inward, so that the arms 41 may pass through the narrowed opening 53 and extend into the cylindrical inner space 53. The arms 41 are then released and the lugs 42 will abut against inner side of the narrowed opening 53, preventing the arms 41 from easily separating from the cylindrical body of the sleeve 5. As mentioned above, the cylindrical inner space 52 has an inner diameter allowing the lugs 42 to smoothly slide therein. Thus, the arms 41 slides in the sleeve 5 like a piston.

The sleeve 5 is provided on circumferential wall of the cylindrical body near the container holder 51 with a plurality of pin holes 54 arranged in two diametrically opposite vertical lines. Two ends of the insertion pin 6 may be selectively inserted into two corresponding pin holes 54 in a loose fit manner, so that the sleeve 5 is rotatable about the insertion pin 6. The insertion pin 6 is a one-piece member and can be removably fixed to the base 1 by engaging its two ends into different pairs of fixing holes (not shown) formed on the base 1. When the insertion pin 6 extends through pin holes 54 at high position closer to the top of the sleeve 5, the container holder 51 swings more moderate than when the insertion pin 6 extends through pin holes 54 at lower positions. That is, when the insertion pin 6 is located at lower positions, the liquid container 2 connected to the container holder 51 swings stronger to produce more changeful waves. Since the position of the insertion pin 6 can be easily changed, the wave-producing ornament with the internally mounted swing mechanism of the present invention provides more choices to a user in presenting desired magnitude of swing of the liquid container 2 relative to the base 1.

FIGS. 3A to 3D illustrate four different phases in an operating cycle of the present invention. When the disc 3 turns, the lower end of the connecting rod 4 connected to the fixed point 31 on the disc 3 moves along with the round disc 3 in a circumferential movement. The moving of the connecting rod 4 in turn causes the arms 41 at upper half part of the connecting rod 4 to slide up or down in the cylindrical inner space 52 of the sleeve 5 like a piston in a cylinder. During the circumferential movement of the lower end of the connecting rod 4, any sideward displacement of the connecting rod 4 shall bring the sleeve 5 to swing leftward or rightward about the insertion pin 6, and any vertical displacement of the connecting rod 4 is absorbed by the cylindrical inner space 52 of the sleeve 5. That is, the connecting rod 4, the sleeve 5, and the insertion pin 6 cooperate with one another to convert the rotating operation of the round disc 3 into the swinging of the sleeve 5. The rotation and swing smoothly and stably cycles, allowing the container holder 51 to firmly support the liquid container 2 for the latter to stably swing along with the container holder 51.

What is claimed is:

1. A wave-producing ornament, said wave-producing ornament including a base having fixing holes provided thereon and a liquid container, and including a swing mechanism being mounted in said base and comprising:

a round disc having a predetermined diameter;

a connect rod having a lower end pivotally connected to said round disc and an upper half part forming two upward and parallelly extended arms to define an upward open space between said two arms, and said arms being provided at upper free ends with lugs;

a sleeve having a top forming a container holder projecting from said base of said ornament for said liquid container to fixedly connect thereto and a cylindrical body below said container holder defining a cylindrical inner space, said cylindrical body being formed of a plurality of pin holes arranged in two diametrically opposite vertical lines corresponding to said fixing holes on said base, and said cylindrical inner space having an inner diameter substantially equal to a breadth defined by said two lugs of said connecting rod for said two arms of said connecting rod to slide up and down inside said cylindrical inner space; and an insertion pin for selectively extending through two diametrically opposite pin holes on said cylindrical body with two ends of said insertion pin inserted into two corresponding fixing holes on said base, such that said sleeve is mounted in said base at a selected height.

2. A wave-producing ornament as claimed in claim 1, wherein said round disc is rotated by a motor in said base and said connecting rod is pivotally connected to said round disc at a point near an outer periphery thereof.

3. A wave-producing ornament as claimed in claim 1, wherein said lugs provided at upper free ends of said two arms of said connecting rod project outward from said upper free ends.

4. A wave-producing ornament as claimed in claim 1, wherein said cylindrical inner space of said sleeve has reduced inner diameter at a lower end to define a narrowed opening, so that a force must be applied on said two arms to push them inward for them to pass through said narrowed opening and extend into said cylindrical inner space of said sleeve.

5. A wave-producing ornament as claimed in claim 1, wherein said insertion pin is selectively inserted into said pin holes on said cylindrical body of said sleeve in a loose fit manner, so that said sleeve may turn about said insertion pin.

* * * * *